United States Patent [19]
Lindh et al.

[11] Patent Number: 5,586,778
[45] Date of Patent: Dec. 24, 1996

[54] COLLAPSIBLE GOLF CART

[75] Inventors: Leif Lindh, Danderyd; Kjell Lindh, Lidingo, both of Sweden

[73] Assignee: Eurogreen International Inc., Chang-Hua Hsien, Taiwan

[21] Appl. No.: 514,136

[22] Filed: Aug. 11, 1995

[51] Int. Cl.$^6$ .................................................. B62B 1/12
[52] U.S. Cl. ........................ 280/40; 280/646; 280/655; 280/47.24; 280/DIG. 6
[58] Field of Search .................................. 280/645, 646, 280/42, 47.24, 47.26, DIG. 6, 39, 40, 651, 652, 654, 655; 248/129, 166, 171

[56] References Cited

U.S. PATENT DOCUMENTS

| | | | |
|---|---|---|---|
| 2,518,803 | 8/1950 | Marvin | 280/DIG. 6 X |
| 2,647,762 | 8/1953 | Jamieson et al. | 280/646 |
| 2,648,545 | 8/1953 | Cassidy | 280/DIG. 6 X |
| 2,743,115 | 4/1956 | Rutledge | 280/DIG. 6 X |
| 3,459,434 | 8/1969 | Dulaney | 280/38 |
| 3,985,373 | 10/1976 | Widegren | 280/652 |
| 4,289,326 | 9/1981 | Hawkes | 280/646 |
| 4,756,539 | 7/1988 | Sneddon | 280/40 |
| 4,887,835 | 12/1989 | Dallaire et al. | 280/DIG. 6 X |

FOREIGN PATENT DOCUMENTS 850125 9/1960 United Kingdom.

*Primary Examiner*—Brian L. Johnson
*Assistant Examiner*—Michael Mar
*Attorney, Agent, or Firm*—Sughrue, Mion, Zinn, Macpeak & Seas

[57] ABSTRACT

A collapsible golf cart includes elongated upper and lower frame parts which are slidable in relation to one another in the longitudinal direction, a support unit for supporting a golf bag on the upper and lower frame parts, and two legs. Each of the legs has an upper end that is connected pivotally to the lower end of the upper frame part so that the legs can be brought into a collapsed position, where the legs are inside and substantially parallel with each other and the upper and lower frame parts, and an opened out position, where the legs and the upper and lower frame parts are moved away from one another. Each of the legs further has a lower end which has a wheel suspension unit for bearing a removable wheel. The golf cart further includes a holding unit for holding the distance between the wheels constant and holding the distance between the wheels and the lower end of the lower frame part when the legs are in the opened out position.

7 Claims, 6 Drawing Sheets

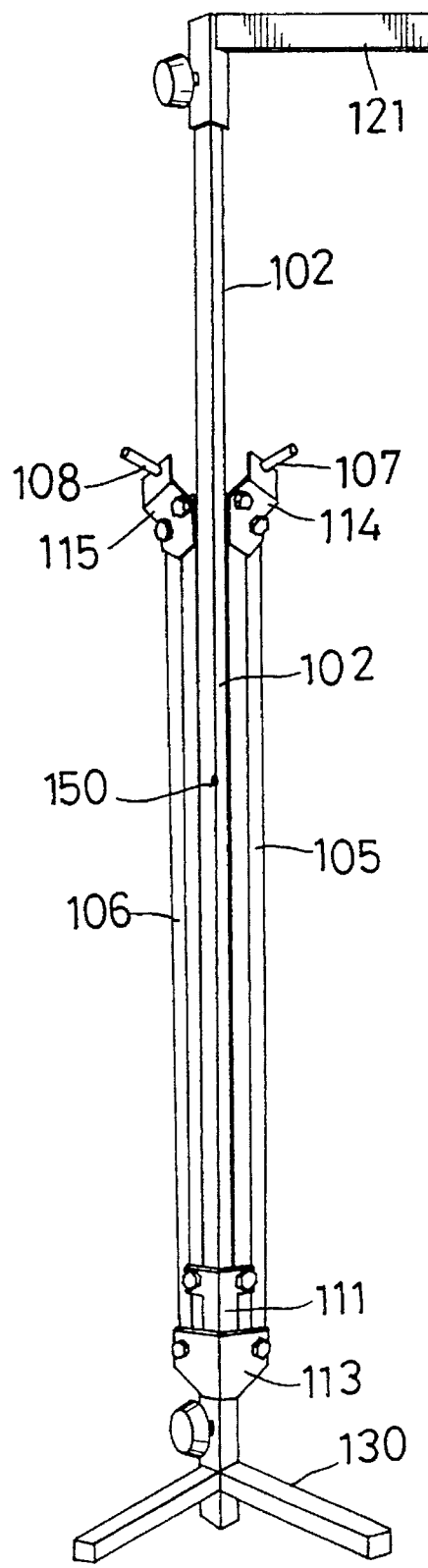
F I G. 3

COLLAPSIBLE GOLF CART

BACKGROUND OF THE INVENTION

1. Field of the Invention

This invention relates to a golf cart, more particularly to collapsible golf cart.

2. Description of the Related Art

A golf player has a problem when practicing his sport, when it concerns transporting golf clubs to and from the golf course and during play. In order to store and transport golf clubs, a golf bag, which can be carried by a strap, but which also can be transported on the golf course on a golf cart in order to facilitate movement, is most often used. During automobile and aerial transport, the bag with club and associated golf cart forms a bulky and cumbersome item of luggage, which steals valuable space, e.g. in the luggage compartment of an automobile, on the one hand because of the cart, and on the other hand because of the wheels belonging to the cart.

In order to facilitate transport of the golf bag, it is known to use collapsible golf carts, which rather often are designed as tripods.

A collapsible tripod is provided with three legs with each having a head end and a foot end, and in which two of the three legs can be attached pivotably by their head ends to the third legs near its head end. This tripod can take up a first, collapsible configuration in which the legs are parallel, and an opened out configuration in which the two pivotably arranged legs diverge from one another when seen from the head ends of the legs, whereby the foot ends of the legs are positioned at three points which are equivalent to the corners of an imaginary triangle. In order to achieve stability in the opened out position, this tripod requires some form of support between the pairs of legs. This support is usually designed in the shape of first and second horizontally arranged links, which are articulated together. Each of said first and second links in its turn are arranged pivotably on the leg that adjoins it.

A golf cart which is used hilly country is subjected loads, partly because of irregularities in the ground, partly because of the weight of the cart with the golf bag and its contents themselves. Because of the stresses on the tripod, a number of locking and unlocking manipulations are performed.

A golf cart in the shape of a tripod is known from EP, A, 0 009 333. In order to improve the stability of this cart, a horizontal support, in the form of first and second pivotally joined links, is pivotably arranged between the two legs each of which has a wheel arranged on a respective one of the lower ends thereof. On the cart's third leg, the leg which supports the golf bag, above the brackets for the two first legs, is a bracket for a pivotably arranged vertical support, of which the second end is pivotably arranged by the common bracket for the two horizontal links between the two first-mentioned legs. The disadvantages which are revealed by this design are that the cart contains many joints and it furthermore contains many parts which, during folding of the cart, make the collapsed cart voluminous and difficult to handle. For example, in the collapsed condition seven elongated parts, the three legs, links, support, connecting organs, have to become essentially parallel. At the same time, there are twelve joints. Each additional part in a cart such as this naturally means that the weight and manufacturing cost increases. At the same time, the number of joints means that the cart is complicated to produce and that matching the different parts can be difficult, while simultaneously the risk of damage to the parts of the cart increases.

Further collapsible golf cart have been described in e.g. U.S. Pat. No. 4 302 029; GB 1 401 130; GB 2 264 465; DE 25 28 968; U.S. Pat. No. 4 793 622; and GB 2 229 972.

The golf carts which are described in U.S. Pat. Nos. 4 302 029, and 4 793 622 have conventional wheel axles, even if those in U.S. Pat. No. 4 793 622 are divided and articulated in order to be able to fold during folding of the cart. These wheel axles require complicated mechanical solution in order that the cart shall be able to be folded up. The golf carts which are described in GB 2 264 465 and GB 2 229 972 feature divided and angled wheel axles.

SUMMARY OF THE INVENTION

An object of the present invention is to provide a golf cart, in which the disadvantages and limitations which exist in the above described golf carts are set aside, and which is simple and reliably constructed and which can be folded up and placed inside the golf bag in collapsed condition.

A further object is to reduce the number of parts and the number of joints comprised in the golf cart according to the present invention in comparison with existing golf cart of similar construction.

A further object is that the golf carts wheels can be released from their legs and passed through by the golf clubs which are inserted into the golf bag in order to be placed on the upper end of the golf bag.

This is brought about by the golf cart according to the present invention having-legs, which are arranged pivotably by the lower end of the upper frame part, and by means being arranged in order to, in the opened out position, on the one hand, hold the distance between the wheels constant, as well as on the other hand, hold the distance between the wheels and the lower ends of the lower frame parts constant.

Preferred embodiments of the golf cart have the characteristics disclosed in the dependent claims.

The golf cart according to the present invention can be easily folded up for transportation and because of it construction can be folded up in such an advantageous manner that in the collapsed condition it can be stored in the golf bag. In addition, according to the present invention, the removable wheels due to their shape, can be overlapped onto one another as well as, because of the configuration of the "spokes", can be pass through by the golf clubs which are inserted into the golf bag in order to be hung on the upper end of the golf bag, as will be further described below.

BRIEF DESCRIPTION OF THE DRAWINGS

The golf cart according to the present invention is described further with reference to the enclosed drawings which show preferred embodiment of the golf cart with accompanying wheel.

FIG. 3 shows a schematic view of the golf cart in collapsed condition.

DETAILED DESCRIPTION OF THE PREFERRED EMBODIMENTS

Figure 1:
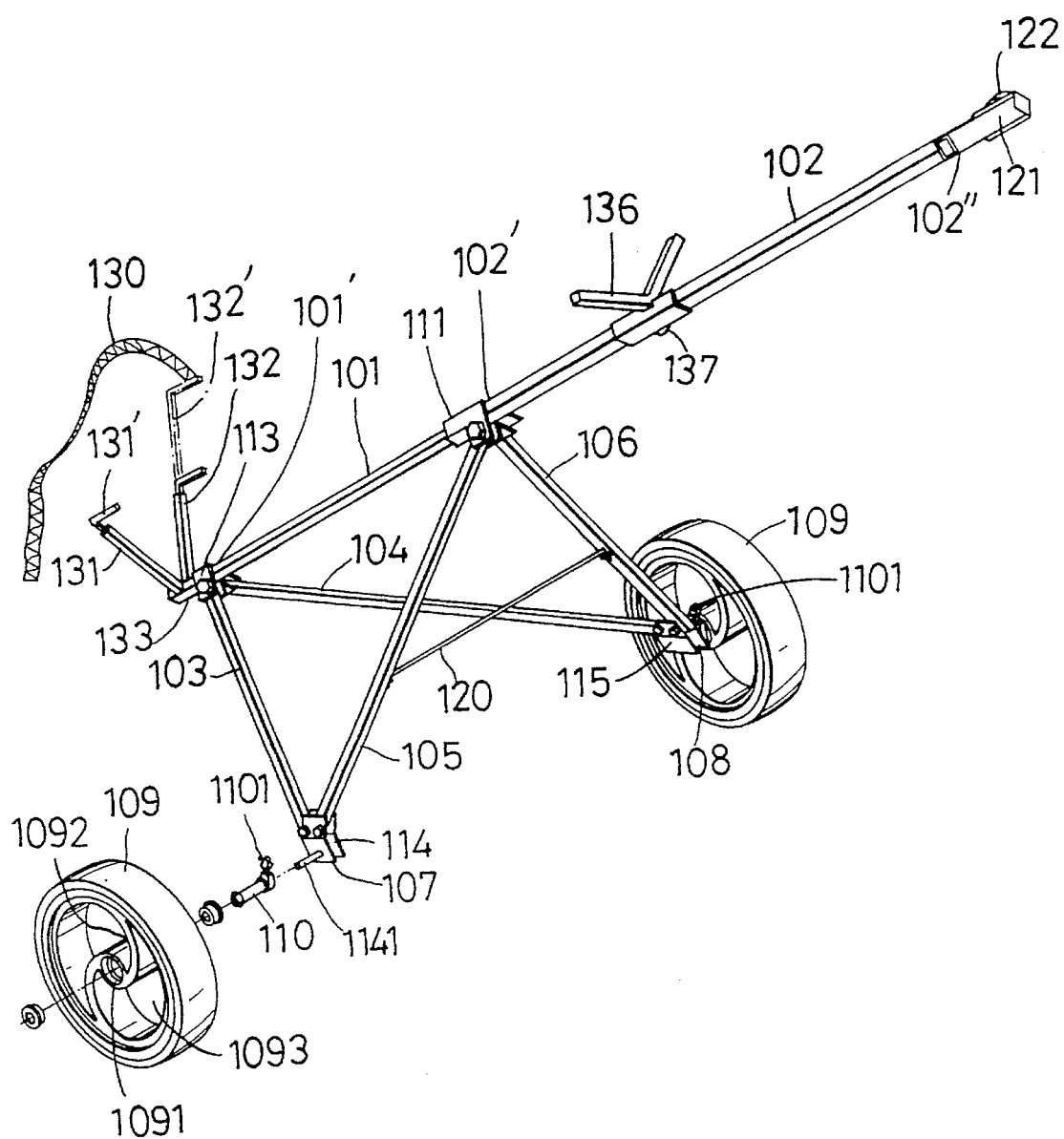
FIG. 1 shows a preferred embodiment of the golf cart according to the present invention.

In FIG. 1, where the golf cart is shown in the opened out position, 101 and 102 refer to lower and upper frame parts on a golf cart according to the present invention. A handle 121 is arranged by the upper end 102" of the upper frame part 102 for pulling the cart on the golf course.

In FIG. 1, the handle 121 is directed out of the plane of the drawing towards the viewer. This handle is, according to the embodiment in the figure, removable and is attached by an attachment means 122 to the upper frame part 102. The handle 121 can best be designed so as to either be introduced into the upper frame part 102 or run on the outside of the same.

By the lower end 102' of the upper frame part 102, a bracket 111 is arranged, the upper ends of two legs 105, 106 being arranged pivotably on the bracket 111. On the lower ends of these legs 105, 106, brackets 114, 115 are arranged. Link arms 103, 104 are arranged pivotably on these brackets 114, 115. The link arms 103, 104 moreover are joined pivotably with a bracket 113 which is connected to the lower end 101' of the lower frame part 101.

A support means, generally indicated with 130 is arranged on the lower end 101' of the lower frame 101 in order to support the lower end of the golf bag. This support means 130 comprises two arms 131 and 132, and a connecting part 133. The support means 130 is shown with the shape of a V, and the connecting part 133 is removably arranged by the lower part 101' of the lower frame part 101, at a determined distance from its lower end. This can be achieve in a simple manner by arranging for the connecting part 133 to slide upon, and be locked at, the lower end 101' of the lower frame part 101.

Arranged in the two arms 131, 132 are two telescopically displaceable angled parts 131', 132', which can be pre- tensioned by means of spring power or arranged in an equivalent manner, so as to take up a position inside the arms 131, 132 when they are not supporting a golf bag, and which are intended to drawn out of the arms sufficiently far enough so as to, together with the arms 131, 132, make up a support, on which the golf cart can rest and where the two angled parts 131', 132' upwardly grip the lower part of the golf bag on its side which faces away from the upper and lower frame parts 102, 101. A strap, a chain or similar can be suitably arranged in connection to one or to both of the angled parts 131', 132' to clamp the golf bag.

The support means 130 can also be arranged in the form of a U-shaped support, which replaces the two arms 131, 132. In a manner equivalent to that described above, two L-shaped parts 131', 132' can be telescopically insertable in the arms 131, 132. The golf bag can also in this case be clamped by an elastic strap or equivalent, which e.g. runs through the L-shaped parts 131', 132' and through the U-shaped support means 130.

In a preferred embodiment, parts 131, 132 and 131', 132' are designed such that a rotational movement between arm and L-shaped part is prevented e.g. through the components having a quadratic cross-section. The two, essentially L-shaped parts 131', 132' are moreover so designed that when withdrawn a determined distance out of the arms 131, 132 they can be twisted so as to end up lying in the same plane as the support means 130, e.g. through a tapered shaped or a round design.

On the upper frame part 102 a carrier 136 is arranged in order to support the golf bag from the side and to prevent it from falling. This carrier 136 can also be provided with a strap or equivalent for fastening around the golf bag. The carrier 136 is not part of the present invention and can be designed according to principles known in the art. By attaching this carrier on the upper frame part 102 with a through locking arrangement 137, it is furthermore possible to ensure the two frame parts position with respect to each other, e.g. by the through locking arrangement 137 either functioning as a stop when one frame part is inserted into the other, or by the locking arrangement 137 simultaneously passing through holes arranged and adapted for it in the two frame parts 101, 102.

FIG. 1 shows also how a connecting means 120 can be arranged between legs 105, 106 in order to ensure their relative alignment when the golf cart is exposed to extra stresses. This connecting means 120 can be designed in many, more or less equally effective, ways. It can have the shape of a chain or one or more releasably connected link arms. The reason for this design is that during folding up and folding open of the golf cart, the legs preform a rotational movement in relation to each other, which complicates the construction of a pivotably connected connecting means.

Referring to FIG. 1, the wheels 109 is especially designed to be superposed on each other and hung on the upper end of the golf bag. Each of the wheels 109 has a hub bore 1091 for attaching the wheel 109 to a wheel axle 110, and two curved spokes 1092 which define two voids 1093 in the wheel 109. Each of the wheel axles 110 is locked releasably to the respective one of the mounting pins 1141 (only one is shown in the figure) of the brackets 114, 115 by means of fastening screws 1101. The voids 1093 of the wheels 109 may be passed through by the golf clubs which are inserted into the golf bag after the wheel 109 is detached from the wheel axles 110 in order to be hung on the upper end of the golf bag.

Figure 2:
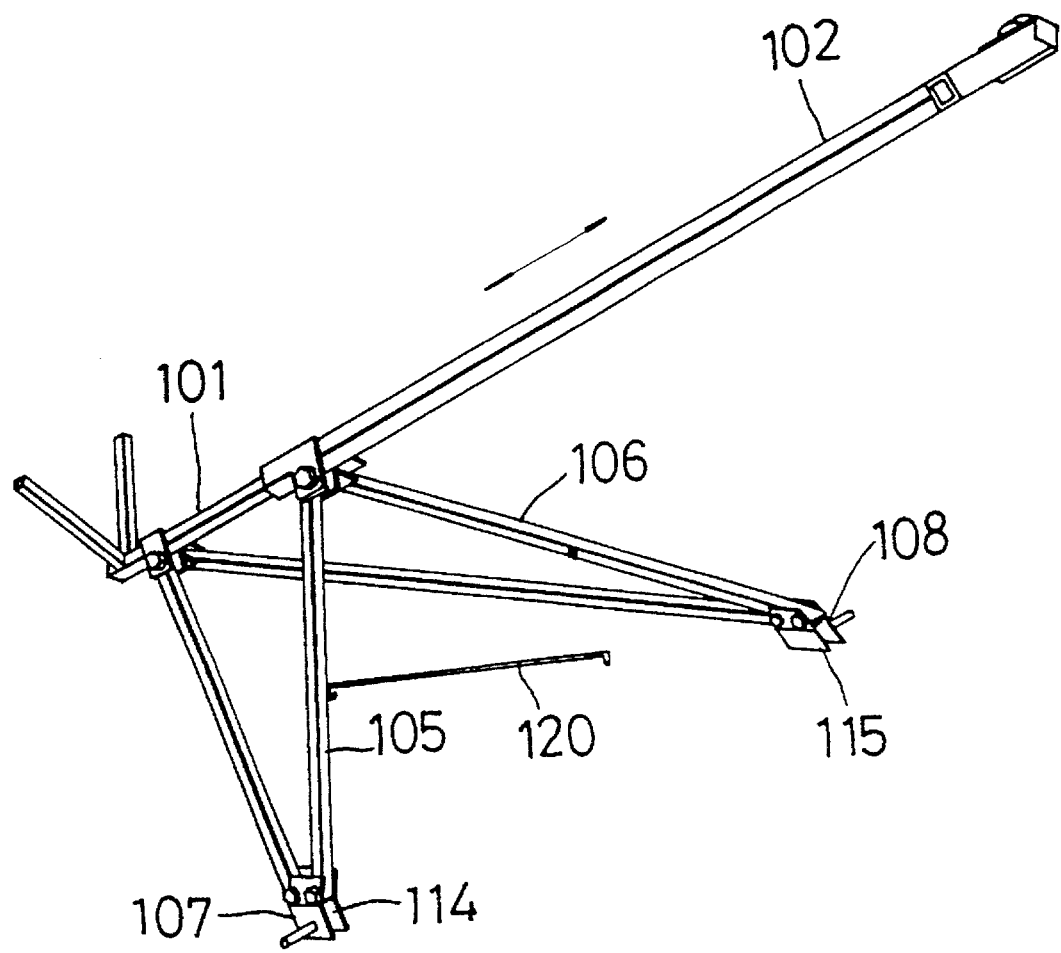
FIG. 2 shows a schematic view of the golf cart in partly collapsed condition.

FIG. 2 shows how wheel suspension means 107, 108 are arranged by the lower ends of the legs 105, 106. These means can naturally be designed as a unit in combination with the lower brackets 114, 115, or as separate units. By means of a twin-headed arrow, it is also shown here the manner in which the lower frame part 101 and the upper frame part 102 are arranged to be telescopically displaced in relation to each other, i.e. the lower frame part 101 can essentially be inserted in the upper frame part 102 and to this effect the upper frame part 102 is provided with an inner, long cavity corresponding to the outer shape of the lower frame part 101. In order to achieve essentially frictionless relative motion between the parts, the lower frame part 101 can be provided with a friction reducing covering of a suitable material and a bush made of the same or compatible material could be arranged in the lower opening of the upper frame part 102. Naturally it is also conceivable that the friction reducing material could be placed inside the hollow upper frame part 102.

FIG. 3 shows the golf cart with removable handle 121 and the removable lower support means 130 in an collapsed position. Here is shown how the golf cart folds up by telescopically displacing the upper frame part 102 in relation to the lower frame part 101, i.e. all of the lower frame parts 101 has slid into the upper frame part 102. When this happens the bracket 111 arranged on the upper frame part 102 is displaced towards bracket 113 at the lower end 101' of the lower frame part 101 at the same time as legs 105 and 106 take up a position essentially parallel with link arms 103 and 104 (not shown in the figure). The brackets 114, 115 with associated wheel suspension means 107, 108 hereby take up a position up against the upper frame part 102.

FIG. 3 shows also the through hole 150 in the upper frame part 102 which is used to fasten the upper support means and which also can be used to lock the two frame parts 101 and 102 relative to each other.

Figure 4:
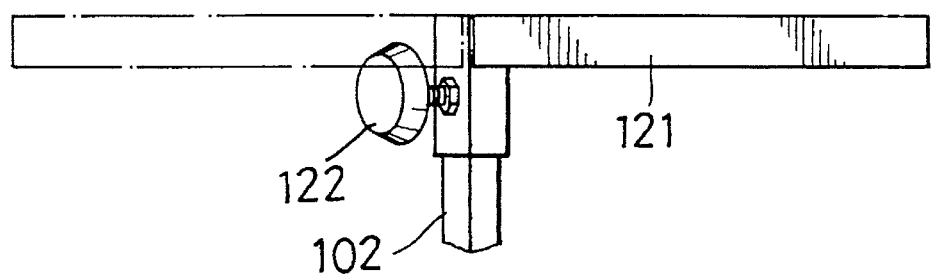
FIG. 4 shows a detail view of the golf cart handle.

FIG. 4 shows one design of the handle 121. This is essentially designed as an L, whereby the shorter part is intended to be carried on the upper end of the upper frame parts 102. It can be alternatively be inserted into the corresponding frame part's end. The handle 121 is arranged to be attached by a through attachment means 122 and its longer part can be positioned in any direction relative to the frame part according to the user's preference. In the embodiment shown in the figures, square tube has been used which naturally means that the handle can be positioned in any of four directions defined by the tube.

Figure 5:
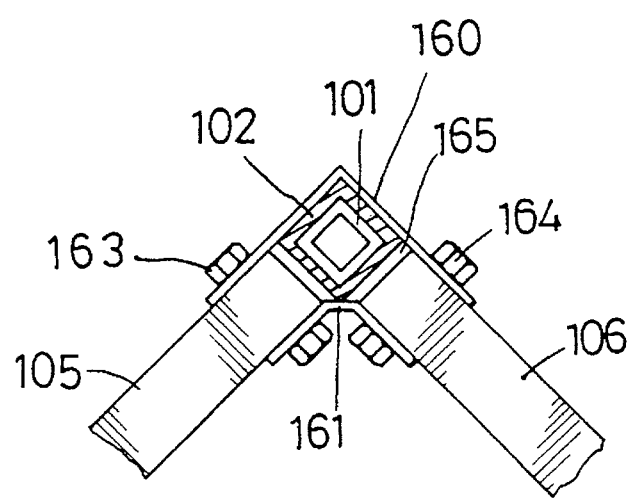
FIG. 5 shows a detail view of the upper bracket for legs on the frame.

FIG. 5 shows, from above, the upper bracket 111 for legs 105, 106, which is arranged by the lower end of the upper frame part 102. The bracket comprises an angle iron 160 with holes for two through bolts 163, 164, as well as an inner angle iron 161, similarly provided with corresponding holes. Parts 160, 161 can advantageously be welded to the lower end of the upper frame part 102. Between the legs 105, 106 and the upper frame part 102, an intervening space 165 is visible. During manufacture of the legs 105, 106 and other articulated parts the tubing can be advantageously reinforced on the inside. The end of the part in question which faces towards a bracket can be shaped so as to have a beveled edge which allows the part to be twisted in the bracket and for the unbeveled edge to form a limit for movement in the joint.

The above described embodiment is naturally not obligatory and other arrangements to permit movement in the joints are possible, e.g. one can arrange the components to be at such distance from each other that they do not obstruct each other. However, in that case, the stabilizing effect of the shorter distances will be lost.

FIG. 5 shows also how the lower frame part 101 is inserted in the upper frame part 102. An advantage of using square shape tube is that the geometry of the cart's movement and the different angles are determined by the side surfaces of the tube. It is nevertheless not necessary to use square tube but ordinary round tube or tube with any desired profile can be used.

The lower bracket 113 is essentially designed in the same manner.

Figure 6:
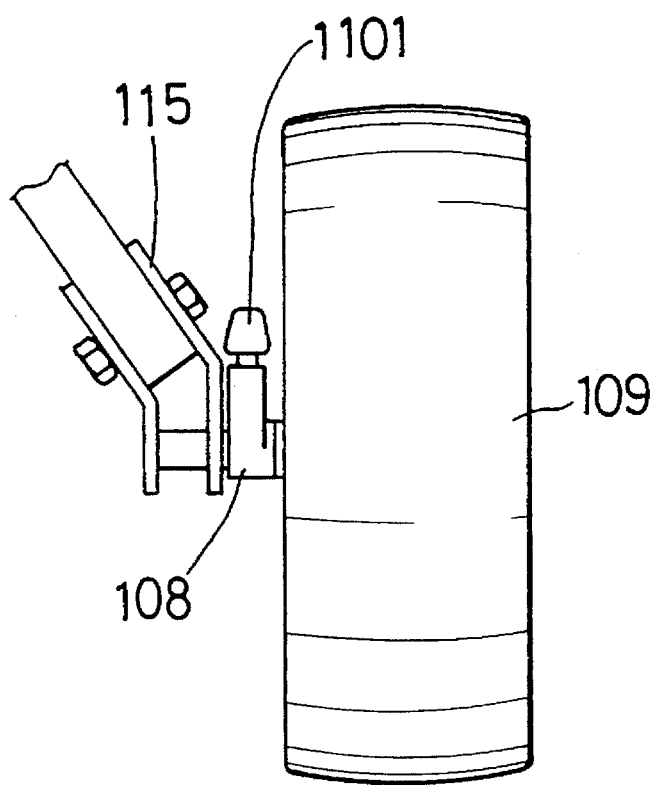
FIG. 6 shows a detail view of the attachment means for the wheel.

FIG. 6 shows the arrangement of wheel suspension means 108 on bracket 115 with a wheel according the present invention.

Figure 7:
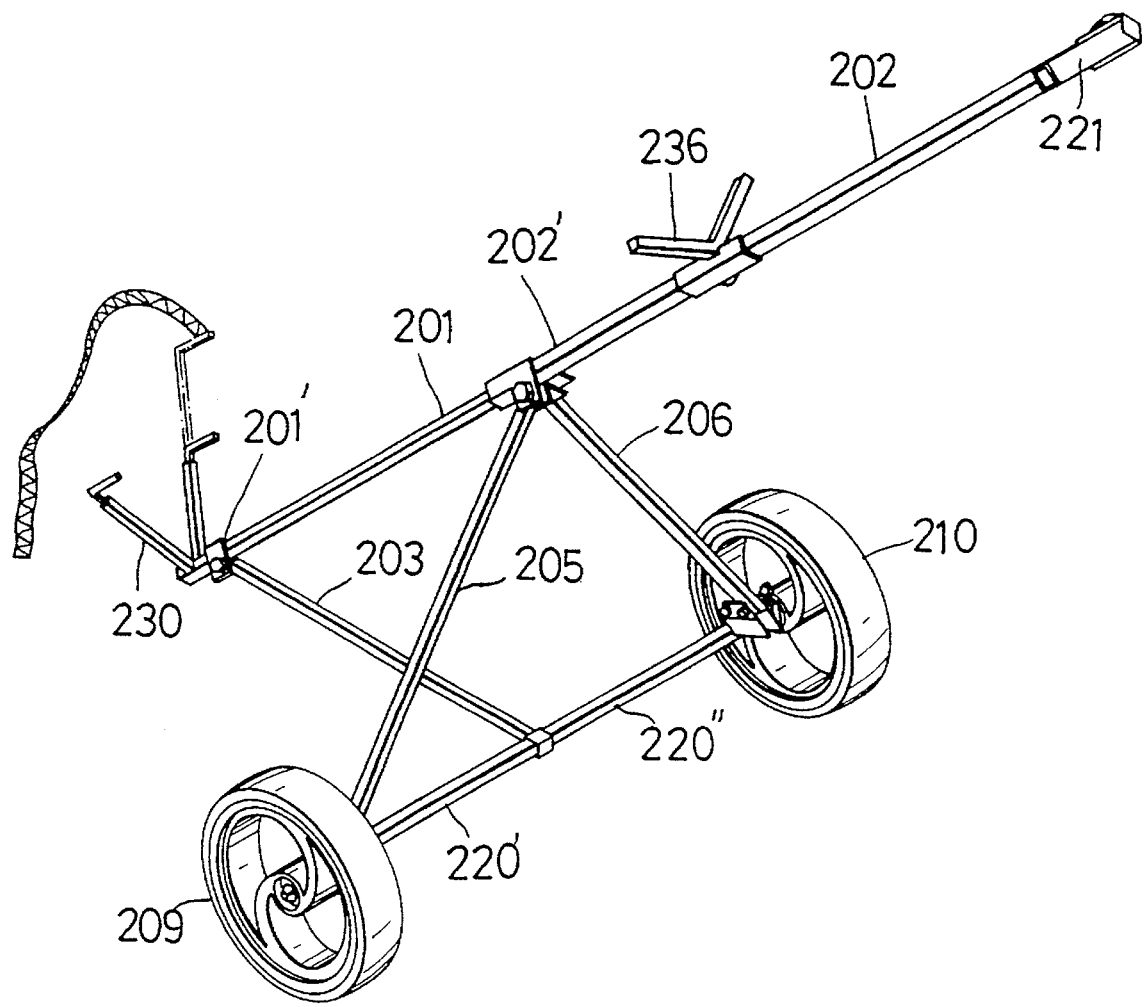
FIG. 7 shows a further preferred embodiment of the golf cart according to the present invention.

FIG. 7 indicates the lower and upper frame parts by 201, 202. Between the lower ends of the legs 205 and 206, an articulated connection consisting of two telescopically insertable and withdrawable link arms 220', 220" is arranged, and between the common joint for the links and the lower end of the lower frame part 201, a further link 203 is arranged. In similarity to the embodiment shown in FIG. 1, the golf cart has a handle 221, a carrier 236 and a support means 230, as well as wheels 209, 210. When the golf cart is folded, the link 203 and the link arms 220', 220" are moved toward the lower frame part 201 so that they are substantially parallel with one another and the lower frame part 201. The common joint for the link arms 220', 220" may be a connecting means which allows the link arms 220', 220" to be connected telescopically, pivotally, or detachably to one another.

In the embodiment shown the telescopically displaced link arms 220', 220" are joined pivotally to the lower ends of the legs 205, 206. It is naturally conceivable to arrange these link arms at a greater distance from the wheel axles.

As is seen on the drawings, the described golf cart is compact in its collapsed condition and can with ease be placed in the golf bag. In order to furthermore facilitate transporting the golf bag and golf cart, the golf cart should naturally be produced in some suitable material, e.g. steel, aluminium, titanium or composites.

The device according to the present invention, as has been described above with reference to the embodiments shown in the drawings can naturally be modified within the frame of the enclosed patent claims with reference to the description and the drawings.

I claim:

1. A collapsible golf cart comprising:

elongated upper and lower frame parts, said lower frame part being slidably received within said upper frame part in a longitudinal direction thereof, said upper frame part having an upper end which has a handle connected thereto, and a lower end into which said lower frame part is inserted, said lower frame part having a lower end;

means for supporting a golf bag on said upper and lower frame parts;

two legs, each of which has an upper end that is connected pivotally to said lower end of said upper frame part so that said legs can be brought into a collapsed position, wherein said legs are pivoted inwardly and substantially parallel with each other and with said upper and lower frame parts, when said lower frame part is slidably received within said upper frame part and an outwardly extended opened position, wherein said legs and said upper and lower frame parts are moved away from one another when said lower frame part is extended outwardly of said upper frame part, each of said legs further having a lower end which has a wheel suspension means for supporting a removable wheel, and link arms pivotally connected between said lower ends of said legs and said lower end of said lower frame part; and holding means for maintaining distance between said wheels constant and for maintaining a distance between said wheels and said lower end of said lower frame part constant when said legs are in said opened position.

2. A collapsible golf cart as claimed in claim 1, wherein said holding means is collapsible.

3. A collapsible golf cart as claimed in claim 2, wherein said holding means includes a strut connected detachably between said legs for holding the distance between said wheels constant, said link arms being pivotally connected between a first bracket that is fixed to said lower end of said lower frame part and a second bracket that is fixed to a respective one of the lower ends of said legs for holding the distance between said wheels and said lower end of said lower frame part constant.

4. A collapsible golf cart as claimed in claim 1, wherein said upper and lower frame parts are formed of tubes with a quadratic cross-section.

5. A collapsible golf cart as claimed in claim 1, wherein said support means comprises two arms and a connecting part between said arms, said arms being in the shape of a V, and said connecting part being removably connected adjacent to said lower end of said lower frame part.

6. A collapsible golf cart as claimed in claim 5, wherein said support means comprises two L-shaped parts inserted slidably and respectively into said two arms.

7. A collapsible golf cart as claimed in claim 1, wherein each of said wheels has a hub bore, a wheel axle inserted rotatably into said hub bore, and two curved spokes which define two voids in said wheel.

* * * * *